United States Patent
Kuo et al.

(10) Patent No.: US 8,830,418 B2
(45) Date of Patent: Sep. 9, 2014

(54) LIQUID DISPLAY DEVICE AND THE BACKPLANE MODULE THEREOF

(75) Inventors: Yi-cheng Kuo, Guandong (CN); Yu-chun Hsiao, Guandong (CN); Chengwen Que, Guandong (CN); Pangling Zhang, Guandong (CN); Dehua Li, Guandong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 177 days.

(21) Appl. No.: 13/641,385

(22) PCT Filed: Sep. 5, 2012

(86) PCT No.: PCT/CN2012/081011
§ 371 (c)(1),
(2), (4) Date: Oct. 15, 2012

(87) PCT Pub. No.: WO2014/032318
PCT Pub. Date: Mar. 6, 2014

(65) Prior Publication Data
US 2014/0063399 A1    Mar. 6, 2014

(51) Int. Cl.
*G02F 1/1333* (2006.01)
*G02F 1/1335* (2006.01)

(52) U.S. Cl.
CPC ................. *G02F 1/133608* (2013.01)
USPC ............... 349/58; 349/61; 362/632; 362/633; 362/634

(58) Field of Classification Search
CPC ................ G02F 1/133608; G02F 1/133308
USPC ................ 349/58, 61; 362/632–634
See application file for complete search history.

(56) References Cited

U.S. PATENT DOCUMENTS

2005/0083449 A1* 4/2005 Morsch ............. 349/58
2007/0216825 A1* 9/2007 Hsu et al. ........... 349/58

* cited by examiner

*Primary Examiner* — Nathanael R Briggs
(74) *Attorney, Agent, or Firm* — Andrew C. Cheng

(57) ABSTRACT

A method for making a heatsink device to be incorporated into a backlight module of a liquid crystal display device is provided and the method comprises the steps of: a) providing a hollowed tube having a substantially rectangular cross section, and the tube including a first support portion, a second supporting, a first vertical section, and a second vertical section interlinked with each other; and b) cutting the hollowed tube along the first and second vertical sections along a longitudinal direction such that first heatsink unit configured with the first supporting portion and the first vertical section, and a second heatsink unit configured with the second supporting portion and the second vertical section are created. The disclosure of the present invention can readily reduce material cost, while promotes the design of light, slim and compact of the product.

19 Claims, 6 Drawing Sheets

LIQUID DISPLAY DEVICE AND THE BACKPLANE MODULE THEREOF

BACKGROUND OF THE INVENTION

1. Field of the Invention

Embodiments of the present disclosure relate to liquid display technology, and more particularly to a liquid crystal device and the backplane thereof.

2. Discussion of the Related Art

Liquid crystal devices include liquid crystal panels, backlight modules and backplanes. Currently, the above components are separately manufactured and are then assembled together. For example, the liquid crystal panels, the backlight modules and the backplanes are manufactured in different factories and then transported to another factory for assembly. In the end, the assembly factory provides the assembled liquid crystal devices to consumers.

Nevertheless, for the liquid crystal devices assembled by manual processes, additional cost is thus needed. In addition, the backplane structure is more complex nowadays, and thus the assembly process is not efficient enough.

SUMMARY

In order to resolve the technical issue encountered by the prior art, the claimed invention introduce a liquid crystal device and a backplane module that may be automatically assembled, and thus the additional cost may be reduced.

In one aspect, a liquid crystal device with a liquid crystal panel, a backlight module, and a backplane module is disclosed. The backplane module includes a backplane for receiving and fixing the backlight module, a first support and a second support. The first support includes as first end and a second end. The first end of the first support includes a first receiving slot for receiving respective ends of the backplane and the liquid crystal panel. The second end of the first support includes a first latch and a second latch. The second latch is arranged between the first receiving slot and the first latch. The second support includes a first end and second end. The first end of the second support includes a second receiving slot for receiving the other ends of the backplane and the liquid crystal panel. The second end of the second support includes a third latch and a fourth latch, and the fourth latch is arranged between the second receiving slot and the third latch. Wherein the third latch engages with the first latch so that the first support and the second support are in a pre-position state. The second latch engages with the third latch and the first latch engages with the fourth latch so that the first support and the second support are in a positioned state. In the positioned state, the first receiving slot and the second receiving slot respectively abuts against the ends of the backplane and the liquid crystal panel.

Wherein the first latch is a first protrusion, the second latch is a second protrusion, the third latch is a first groove, the fourth latch is a second groove, in the pre-position state, the first protrusion engages with the first groove, and in the positioned state, the first protrusion engages with the second groove and the second protrusion engages with the first groove.

Wherein the first latch is a first hook, the second latch is a second hook, the third latch is a first slot, the fourth latch is a second slot, in pre-position state, the first hook engages with the first slot, and in positioned state, the first hook engages with the second slot and the second hook engages with the first slot.

Wherein the first support includes a first bottom for supporting the backplane, a first wall for pressing the liquid crystal panel and a first sidewall connecting the first bottom and the first wall, the first sidewall is for abutting against one end of the backplane, and the first bottom, the first wall, and the first sidewall cooperatively define the first receiving slot 13; and the second support includes a second bottom for supporting the backplane, a second wall for pressing the liquid crystal panel, and a second sidewall connecting the second bottom and the second wall, the second sidewall is for abutting against the other end of the backplane, and the second bottom, the second wall, and the second sidewall cooperatively define the second receiving slot.

Wherein a guiding slot is arranged in the second end of the first support to guide the second support to slide in a predetermined direction; or a guiding slot is arranged in the second end of the second support to guide the second support to slide in a predetermined direction.

Wherein the first latch and the third latch are made by elastic materials so that the first latch is detached from the first receiving slot when extrusion pressure being applied to the first support and the second support in the guiding slot is larger than a predetermined value.

Wherein the backplane module includes a plurality of the first supports and second supports, and each of the first supports correspond to each of the second support.

In another aspect, a backplane module for as liquid crystal device is disclosed. The liquid crystal device includes a liquid crystal panel and a backlight module. The backplane module includes a backplane for receiving and fixing the backlight module, a first support, and a second support. The first support includes a first end and a second end. The first end of the first support includes a first receiving slot for receiving respective ends of the backplane and the liquid crystal panel. The second end of the first support includes a first latch and a second latch, and the second latch is arranged between the first receiving slot and the first latch. The second support includes a first end and second end, the first end of the second support includes a second receiving slot for receiving the other ends of the backplane and the liquid crystal panel. The second end of the second support includes a third latch. Wherein the third latch engages with the first latch so that the first support and the second support are in a pre-position state. The second latch engages with the third latch so that the first support and the second support are in a positioned state, and in the positioned state. The first receiving slot and the second receiving slot respectively abuts against the ends of the backplane and the liquid crystal panel.

Wherein the first latch is a first protrusion, the second latch is a second protrusion, the third latch is a groove, in the pre-position state, the first protrusion engages with the groove, and in the positioned state, the second protrusion engages with the groove; or the first latch is a first groove, the second latch is a second groove, the third latch is a protrusion, in the pre-position state, the first groove engages with the protrusion, and in the positioned state, the second groove engages with the protrusion.

Wherein the second end of the second support further includes a fourth batch arranged between the second receiving slot and the third latch, and in the positioned state, the fourth latch engages with the first latch.

Wherein the first latch is a first protrusion, the second latch is a second protrusion, the third latch is a first groove, the fourth latch is a second groove, in the pre-position state, the first protrusion engages with the first groove, and in the positioned state, the first protrusion engages with the second groove and the second protrusion engages with the first groove.

Wherein the first support includes a first bottom Liar supporting the backplane, a first wall for pressing the liquid crystal panel, and a first sidewall connecting the first bottom and the first wall, the first sidewall is for abutting against one end of the backplane, and the first bottom, the first wall, and the first sidewall cooperatively define the first receiving slot; and the second support includes a second bottom fir supporting the backplane, a second wall for pressing the liquid crystal panel, and a second sidewall connecting the second bottom and the second wall, the second sidewall is for abutting against the other end of the backplane, and the second bottom, the second wall, and the second sidewall cooperatively define the second receiving slot.

Wherein a guiding slot is arranged in the second end of the first support to guide the second support to slide in a predetermined direction; or a guiding slot is arranged in the second end of the second support to guide the second support to slide in a predetermined direction.

Wherein the first latch and the third latch are made by elastic materials so that the first latch is detached from the first receiving slot when extrusion pressure being applied to the first support and the second support in the guiding slot is larger than as predetermined value.

Wherein the first latch is a first hook, the second latch is a second hook, the third latch is a first slot, the fourth latch is a second slot, in pre-position state, the first hook engages with the first slot, and in positioned state, the first hook engages with the second slot and the second hook engages with the first slot.

Wherein the first support includes a first bottom tar supporting the backplane, a first wall for pressing the liquid crystal panel, and a first sidewall connecting the first bottom and the first wall, the first sidewall is for abutting against one end of the backplane, and the first bottom, the first wall, and the first sidewall cooperatively define the first receiving slot; and the second support includes a second bottom for supporting the backplane, a second wall for pressing the liquid crystal panel, and a second sidewall connecting the second bottom and the second wall, the second sidewall is for abutting against the other end of the backplane, and the second bottom, the second wall, and the second sidewall cooperatively define the second receiving slot.

Wherein a guiding slot is arranged in the second end of the first support to guide the second support to slide in a predetermined direction; or a guiding slot is arranged in the second end of the second support to guide the second support to slide in a predetermined direction.

Wherein the first latch at ad the third latch are made by elastic materials so that the first latch is detached from the first receiving slot when extrusion pressure being applied to the first support and the second support in the guiding slot is larger than a predetermined value.

Wherein the backplane module includes a plurality of the first supports and second supports, and each of the first supports correspond to each of the second support.

The backplane module includes the first support and the second support with two connection states. During the assembly process, the first support and the second support may be transferred from the pre-position state to the positioned state due to the extrusion pressure from the assembly apparatus. The backplane module may be automatically assembled so that the assembly efficiency is enhanced and the assembly cost of the backplane, module and the liquid crystal device are reduced.

DETAILED DESCRIPTION OF THE EMBODIMENTS

Figure 1:
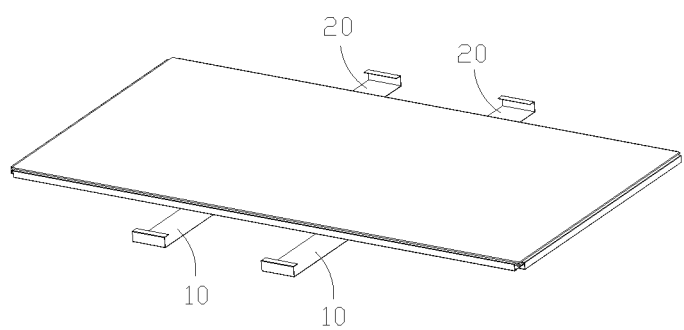
FIG. 1 is a schematic view of the structure of a liquid crystal device in accordance with a first embodiment, wherein the first support and the second support are in a pre-position state.
Figure 2:
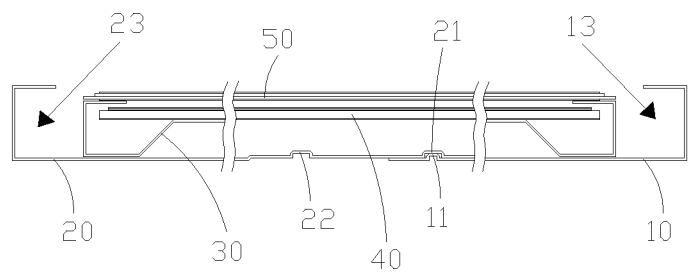
FIG. 2 is a cross-section view of the structure of the liquid crystal device of FIG. 1.

Embodiments of the invention will now be described more fully hereinafter with reference to the accompanying drawings, in which embodiments of the invention are shown.

Referring to FIGS. 1 to 4, the liquid crystal device includes, but not limited to, a liquid crystal panel 50, a backlight module 40, and a backplane module. The backplane module includes, but not limited to, a backplane 30, a first support 10, and a second support 20. The backplane 30 is for receiving and fixing the backlight module 40 and for protecting the backlight module 40 at the same time. In addition, structures on the top of the backplane 30 not only may press and fix the backlight module 40, but also may support the liquid crystal panel 50.

As the backplane 30, the backlight module 40, the liquid crystal panel 50 may be easily understood by the persons skilled in the art, the corresponding descriptions regarding the above components are omitted here. The concrete structure and the assembly methods of the first support 10 and the second support 20 will be described more fully hereinafter.

A first end of the first support 10 includes a first receiving slot 13 for receiving one ends of the backplane 30 and the liquid crystal panel 50. A second end of the first support 10 includes a first latch 11 and a second latch 12. The second latch 12 is arranged between the first receiving slot 13 and the first latch 11.

A first end of the second support 20 includes a second receiving slot 23 for receiving the other ends of the backplane 30 and the liquid crystal panel 50. A second end of the second support 20 includes a third latch 21 and a fourth latch 22. The fourth latch 22 is arranged between the second receiving slot 23 and the third latch 21.

In the embodiment, the first receiving slot 13 and the second receiving slot 23 are U-shaped, in other embodiments, the first receiving slot 13 and the second receiving slot 23 may have other shapes only if the second receiving slot 23 may be engaged with respective ends of the backplane 30 and the liquid crystal panel 50.

In addition, the first receiving slot 13 and the second receiving slot 23 are for receiving respective ends of the backplane 30 and the liquid crystal panel 50. It is understood that the shapes of the first receiving slot 13 and the second receiving slot 23 may be changed only if the first receiving slot 13 and the second receiving slot 23 may abut against on respective ends of the backplane 30 and the liquid crystal panel 50.

When the first: support 10 and the second support 20 are in a pre-position state, the first latch 11 engages with the third latch 21. At this time, the first receiving slot 13 and the second receiving slot 23 have not abutted against the respective ends of the backplane 30 and the liquid crystal panel 50. There is a certain distance between the respective end of the backplane 30 and the first receiving slot 13, and between the respective end of the backplane 30 and the second receiving slot 23. Similarly, there is a certain distance between the respective end of the liquid crystal panel 50 and the first receiving slot 13, and between the respective end of the liquid crystal panel 50 and the second receiving slot 23. When the first support 10 and the second support 20 are in a positioned state, the first latch 11 engages with the fourth latch 22, and the second latch 12 engages with the third latch 21. At the same time, the first receiving slot 13 and the second receiving slot 23 respectively abuts against the ends of the backplane 30 and the liquid crystal panel 50.

That is to say, when the first support 10 and the second support 20 transfer from the pre-position state to the positioned state, the first latch 11 has detached from the third latch 21, and then the first latch 11 engages with the fourth latch 22. At the same time, the first receiving slot 13 and the second receiving slot 23 move inward so as to respectively abut on the ends of the backplane 30 and the liquid crystal panel 50.

Figure 5:
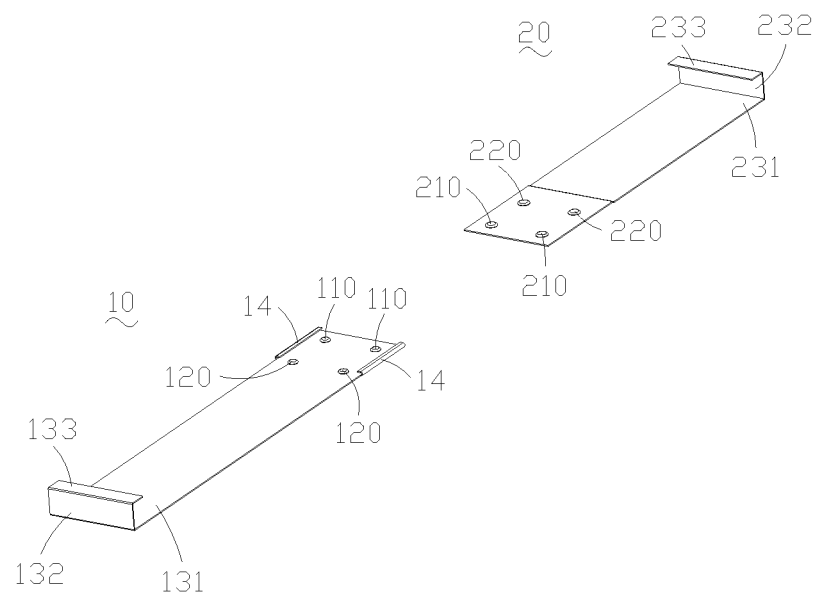
FIG. 5 is a schematic view of the structure of the first support and the second support in accordance with the first embodiment.

Referring to FIG. 5, in the embodiment, a guiding slot 14 is arranged in the second end of the first support 10 to facilitate the slide between the first support 10 and the second support 20. The guiding slot 14 is for guiding the second support 20 to slide in a predetermined direction. In other embodiments, the guiding slot 14 may he arranged on the second end of the second support 20.

In one embodiment, the length of the guiding slot 14 may be the same with the distance between the latches. In other embodiments, the length of the guiding slot 14 may be the same with that of the first support 10. The guiding slot 14 may be, but not limited to, arranged in the bottom of the first support 10 or the second support 20. In addition, the guiding slot 14 may be L-shaped barricade connected with one side of the first support 10 or the second support 20.

Figure 6:
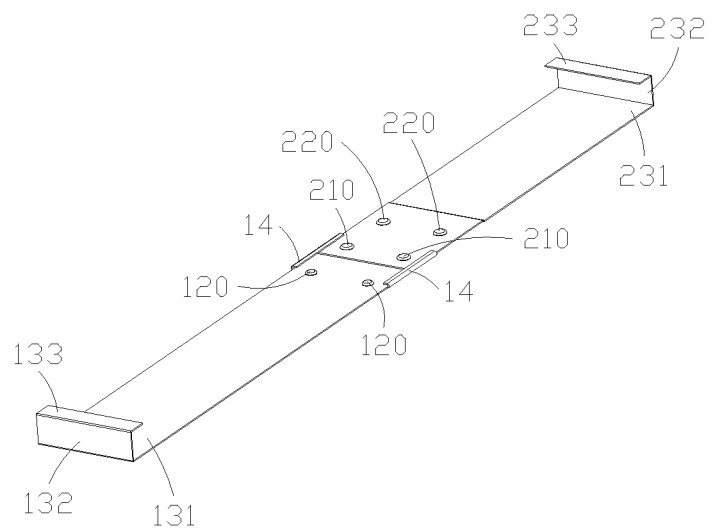
FIG. 6 is a schematic view of the structure of the first support and the second support of FIG. 5, wherein the first support and the second support are in the pre-position state.
Figure 7:
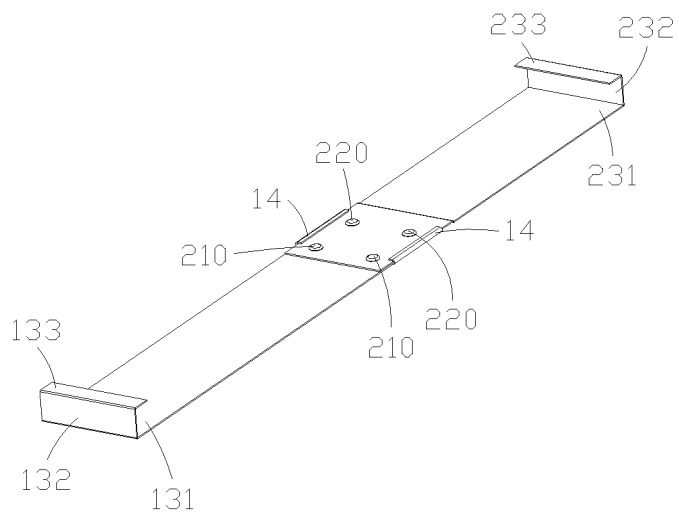
FIG. 7 is a schematic view of the structure of the first support and the second support of FIG. 6, wherein the first support and the second support are in the positioned state.

Referring to FIGS. 5 to 7, specifically, the first support 10 includes a first bottom 131, a first wall 133, and a first sidewall 132 connecting the first bottom 131 and the first wall 133. The first bottom 131 is for supporting the backplane 30. The first wall 133 is for pressing the liquid crystal panel 50. The first sidewall 132 is for abutting against one end of the backplane 30. The first bottom 131, the first 133, and the first sidewall 132 cooperatively define the first receiving slot 13.

Similarly, the second support 20 includes a second bottom 231, a second wall 233, and a second sidewall 232 connecting the second bottom 231 and the second wall 233. The second bottom 231 is for supporting the backplane 30. The second wall 233 is for pressing the liquid crystal panel 50. The second sidewall 232 is for abutting against the other end of the backplane 30. The second bottom 231, the second wall 233, and the second sidewall 232 cooperatively define the second receiving slot 23.

It is to be noted that the concrete structures of the first bottom 131, the second bottom 231, the first sidewall 132, the second sidewall 232, the first wail 133, and the second wall 233 of the first support 10 and the second support 20 may he flexibly configured. For example, the sidewalls may be a plurality of pillars spaced from each other, and the pillars connect the above bottoms and walls. The shape of the walls may he rectangular, semicircle, or even triangle. Similarly, the size of the bottoms, walls, and sidewalls may be changed when needed.

In the first embodiment, the first latch 11 is a first protrusion 110, and the second latch 12 is a second protrusion 120. The third latch 21 is a first groove 210, and the fourth latch 22 is a second groove 220. In other embodiments, the first latch 11 and second latch 12 may he grooves, and the third latch 21 and the fourth latch 22 may be protrusions. In other embodiments, the third latch 21 and the fourth latch 22 may be through holes so as to engage with the protrusions of the first latch 11 and the second latch 12.

In the pre-position state, the first protrusion 110 engages with the first groove 210. In the positioned state, the first protrusion 110 engages with the second groove 220, and the second protrusion 120 engages with the first groove 210.

The automatic assembly of the backplane module of the first embodiment will now be described with reference to FIGS, 5 to 7. It is shown in FIG. 5 that the concrete structure of the first support 10 and the second support 20 are symmetric. In this way, the first support 10 and the second support 20 may he manufactured by the same mold so that the mold cost is reduced. Referring to FIGS. 6 and 7, before being assembled, the first support 10 and the second support 20 are in the pre-positioned state, and the first protrusion 110 and the first groove 210 are engaged. It is to be noted that the first support 10 and the second support 20 may be configured to he in the pre-positioned state when being manufactured.

During the assembly process, the extrusion pressure from robotic arms of the assembly apparatus has forced the first protrusion 110 and the first groove 210 to be detached, the first protrusion 110 and the second groove 220 to be engaged with each other, and the second protrusion 120 and the first groove 210 to be engaged with each other so that the first support 10 and the second support 20 are in the positioned state.

In the embodiment, the latches include two protrusion 110, 120, and two grooves 220, 220. In other embodiments, the latches may include more than two protrusions and grooves. In addition, the concrete structures of the protrusions and the moves may be triangle or rectangle. It is understood that the structure, size, and shape of the protrusions and the grooves are not limited to the above disclosure.

In other embodiments, the tour latches may be hooks and slots, or positioning pillars and positioning holes. For example, the first latch 11 is a first hook, and the second latch 12 is a second hook. The third latch 21 is a first slot, and the fourth latch 22 is a second slot. In pre-position state, the first hook engages with the first slot. In positioned state, the first hook engages with the second slot, and the second hook engage s with the first slot. It is understood that the structure, size and shape of the hooks and the slots are not limited to the above disclosure.

Figure 3:
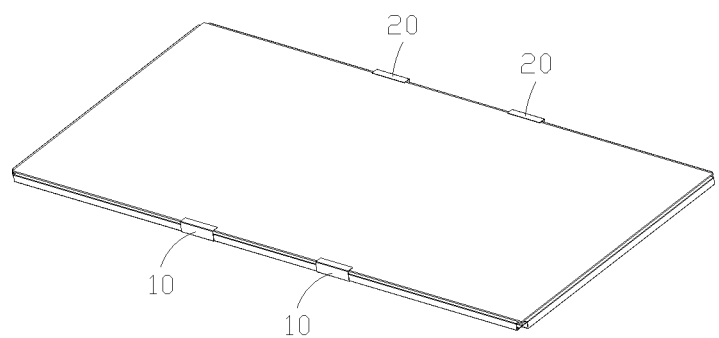
FIG. 3 is a schematic view of the structure cit the liquid crystal device of FIG. 1, wherein the first support and the second support are in a positioned state.
Figure 4:
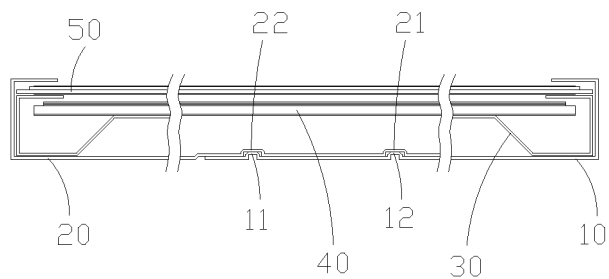
FIG. 4 is a cross-section view of the structure of the liquid crystal device of FIG. 3.

Referring to FIGS. 1 and 3, in the first embodiment, the liquid crystal device includes two backplane modules. In other embodiments, the liquid crystal device may include, but not limited to one, three, six backplane modules. In the preferable embodiments, there is a plurality of backplane modules spaced apart from each other. In addition, the arrangement of the backplane modules may be variably configured, such as a cross-shaped arrangement. It is understood that the concrete structure, such as width or thickness, size, and arrangement or the backplane module are not limited thereto.

In the embodiment, the first latch 11 and the third latch 21 are made by elastic materials, such as plastic or silica gel. As such, the first latch 11 and the first receiving slot 13 are detached when the extrusion pressure being applied to the first support 10 and the second support 20 in the guiding slot 14 is larger than a predetermined value. It is understood that the first support 10 and the second support 20 may be made by elastic materials.

For example, the first protrusion 110 of the first latch 11 may be made by plastic materials. When the extrusion pressure is large enough to deform the elastic materials, the list latch 11 may be detached from the first receiving slot 13. Generally, the first groove 210 is also made by elastic materials so as to protect the first protrusion 110 from being scratched. In addition, adopting the elastic materials may also reduce the cost of the backplane and the liquid crystal device. It is to he noted that the elastic materials is a preferred solution, but not the only solution. The harder materials may also he adopted by making the corners to be smooth. As such, the materials of the first latch 11 and the third latch 21, also the second latch 12 and the fourth latch 22, are not limited.

In the first embodiment, the first support 10 includes the first latch 11 and the second latch 12, and the second support 20 includes the third latch 21 and the fourth latch 22. The first support 10 and the second support 20 have two connecting states: the pre-position state and the positioned state. Before being assembled, the first support 10 and the second support 20 are in the pre-position state. During the assembly process, the first latch 11 and the third latch 21 are detached due to the extrusion pressure. In the end, the first support 10 and the second support 20 transfers to the positioned state. Therefore, the backplane module of the first embodiment may be automatically assembled so that the assembly cost is reduced.

Figure 8:
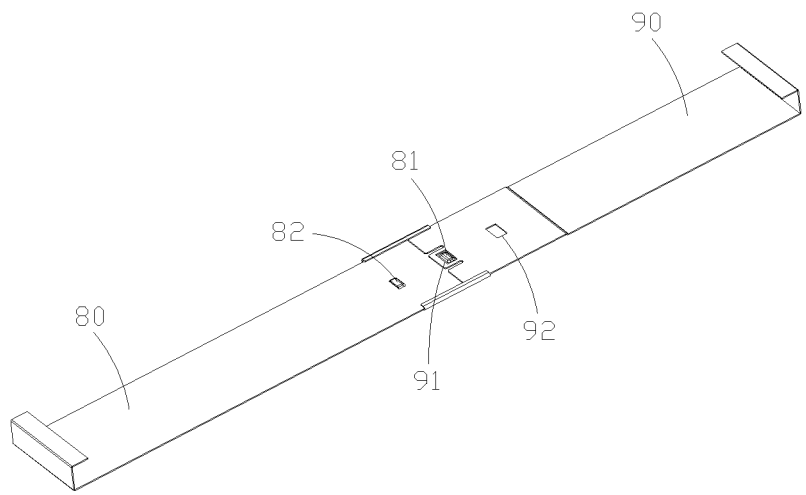
FIG. 8 is a schematic view of the structure of the first support and the second support in accordance with a second embodiment, wherein the first support and the second support are in the pre-position state.
Figure 9:
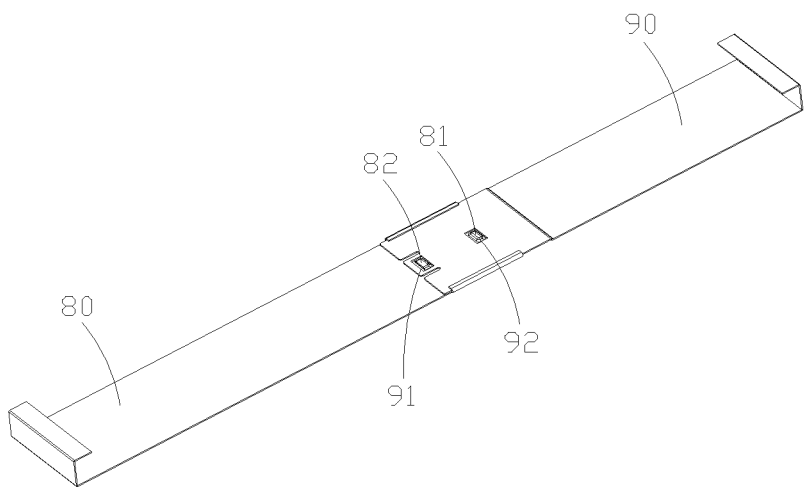
FIG. 9 is a schematic view of the structure of the first support and the second support of FIG. 8, wherein the first support and the second support are in the positioned state.

FIGS. 8 and 9 are schematic views of the structure of the backplane module in accordance with the second embodiment. The difference of the backplane module between the first embodiment and the second embodiment resides in that the latches of the backplane module of the second embodiment are protrusions and through holes.

Specifically, the first support 80 includes a first protrusion 81 (the first latch) and a second protrusion 82 (the second latch). Correspondingly, the second support 90 includes a first through hole 91 (the third latch) and a second through hole 92 (the fourth latch). The protrusions may pass through the through holes. When the first support 80 and the second support 90 are in the pre-position state, the first protrusion 81 passes through the first through hole 91. When the first support 80 and the second support 90 are in the positioned state, the list protrusion 81 passes through the second through hole 92, and the second protrusion 82 passes 11 rough the first through hole 91.

As the concrete structure and the assembly method of the backplane module are described fully in the first embodiment, the corresponding detail descriptions are omitted hereinafter. However, the shape and the number of the protrusions and the through holes may be flexibly configured. It is understood that the backplane module may be automatically assembled so that the assembly cost of the backplane and the liquid crystal device may be reduced accordingly.

Figure 10:
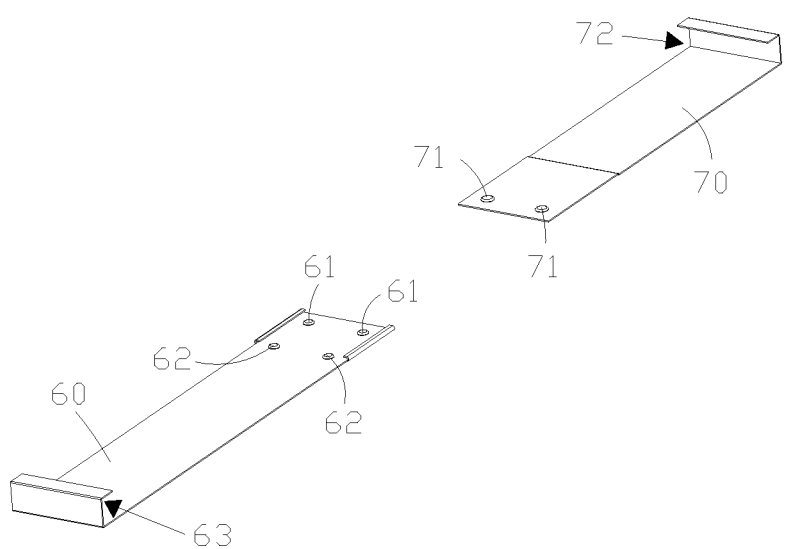
FIG. 10 is a schematic view of the structure of the first support and the second support in accordance with a third embodiment.

FIG. 10 is a schematic view of the structure or the first support and the second support in accordance with a third embodiment. In the third embodiment, the liquid crystal device includes the liquid crystal panel (not shown), the backlight module (not shown), and the backplane module. The backplane module includes the backplane (not shown), a first support 60, and a second support 70.

A first end of the first support 60 includes a first slot 63 for receiving respective ends of the backplane and the liquid crystal panel. A second end of the first support 60 includes a first latch and a second latch. The second latch is arranged between the first receiving slot 63 and the first latch. A first end of the second support 70 includes a second receiving slot 72 for receiving the other respective ends of the backplane and the liquid crystal panel. A second end or the second support includes a third latch 21.

When the first support 60 and the second support 70 are in the pre-position state, the first latch engages with the third latch. When the first support 60 and the second support 70 are in the positioned state, the second latch engages with the third latch.

Specifically the first latch is a first protrusion 61, the second latch is a second protrusion 62, and the third latch is a groove 71. In other embodiments, the first latch and the second latch may be grooves, and the third latch may he a protrusion.

Comparing to the first embodiment, the second support 70 includes a third latch, and the second support 70 does not include a fourth latch. In other words, the concrete structure of the first support 60 and the second support 70 are simpler than that of the first embodiment.

As the concrete structure and the assembly method of the backplane module are described fully in the first embodiment, the corresponding detail descriptions are omitted hereinafter. It is understood that the backplane module of the third embodiment may also be automatically assembled so that the assembly cost of the backplane and the liquid crystal device may be reduced accordingly.

In the fourth embodiment, a liquid crystal device includes the backplane module disclosed in the first, the second, or the third embodiment. By adopting the above backplane module, the liquid crystal device may he automatically assembled so as to reduce the assembly cost.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is

1. A liquid crystal device with a liquid crystal panel, a backlight module, and a backplane module, the backplane module comprising:
   a backplane for receiving and fixing the backlight module;
   a first support with a first end and a second end, the first end comprises a first receiving slot for receiving respective ends of the backplane and the liquid crystal panel, the second end comprises a first latch and a second latch, and the second latch is arranged between the first receiving skit and the first latch;
   a second support with a first end and second end, the first end comprises a second receiving slot for receiving the other ends of the backplane and the liquid crystal panel, the second end comprises a third latch and a fourth latch, and the fourth latch is arranged between the second receiving slot and the third latch; and
   wherein the third latch engages with the first latch so that the first support and the second support are in a pre-position state, the second latch engages with the third latch and the first latch engages with the fourth latch so that the first support and the second support are in a positioned state, and in the positioned state, the first receiving slot and the second receiving slot respectively abuts against the ends of the backplane and the liquid crystal panel.

2. The liquid crystal device as claimed in claim 1, wherein the first latch is a first protrusion, the second latch is a second protrusion, the third latch is a first groove, the fourth latch is a second groove, in the pre-position state, the first protrusion engages with the first groove, and in the positioned state, the first protrusion engages with the second groove and the second protrusion engages with the first groove.

3. The liquid crystal device as claimed in claim 1, wherein the first latch is a first hook, the second latch is a second hook, the third latch is a first slot, the fourth latch is a second slot, in pre-position state, the first hook engages with the first slot, and in positioned state, the first hook engages with the second slot and the second hook engages with the first slot.

4. The liquid crystal device as claimed in claim 1, wherein
the first support comprises a first bottom for supporting the backplane, a first wall for pressing the liquid crystal panel, and a first sidewall connecting the first bottom and the first wall, the first sidewall is for abutting against one end of the backplane, and the first bottom, the first wall, and the first sidewall cooperatively define the first receiving slot; and
the second support comprises a second bottom for supporting the backplane, a second wall for pressing the liquid crystal panel, and a second sidewall connecting the second bottom and the second wall, the second sidewall is for abutting against the other end of the backplane, and the second bottom, the second wall, and the second sidewall cooperatively define the second receiving slot.

5. The liquid crystal device as claimed in claim 1, wherein
a guiding slot is arranged in the second end of the first support to guide the second support to slide in a predetermined direction; or
a guiding slot is arranged in the second end of the second support to guide the second support to slide in a predetermined direction.

6. The liquid crystal device as claimed in claim 1, wherein the first latch and the third latch are made by elastic materials so that the first latch is detached from the first receiving slot when extrusion pressure being applied to the first support and the second support in the guiding slot is larger than a predetermined value.

7. The liquid crystal device as claimed in claim 1, wherein the backplane module comprises a plurality of the first supports and second supports, and each of the first supports correspond to each of the second support.

8. A backplane module for a liquid crystal device, the liquid crystal device comprises a liquid crystal panel and a backlight module, the backplane module comprising:
a backplane for receiving and fixing the backlight module;
a first support with a first end and a second end, the first end comprises a first receiving slot for receiving respective ends of the backplane and the liquid crystal panel, the second end comprises a first latch and a second latch, and the second latch is arranged between the first receiving slot and the first latch;
a second support with a first end and second end, the first end comprises a second receiving slot for receiving the other ends of the backplane aid the liquid crystal panel, the second end comprises a third latch; and
wherein the third latch engages with the first latch so that the first support and the second support are in a pre-position state, the second latch engages with the third latch so that the first support and the second support are in a positioned state, and in the positioned state, the first receiving slot and the second receiving slot respectively abuts against the ends of the backplane and the liquid crystal panel.

9. The backplane module as claimed in claim 8, wherein
the first latch is a first protrusion, the second latch is a second protrusion, the third latch is a groove, in the pre-position state, the first protrusion engages with the groove, and in the positioned state, the second protrusion engages with the groove; or
the first latch is a first groove the second latch is a second groove the third latch is a protrusion, in the pre-position state, the first groove engages with the protrusion, and in the positioned state, the second groove engages with the protrusion.

10. The backplane module as claimed in claim 8, wherein the second end of the second support further comprises a fourth latch arranged between the second receiving slot and the third latch, and in the positioned state, the fourth latch engages with the first latch.

11. The backplane module as claimed in claim 10, wherein the first latch is a first protrusion, the second latch is a second protrusion, the third latch is a first groove, the fourth latch is a second groove, in the pre-position state, the first protrusion engages with the first groove, and in the positioned state, the first protrusion engages with the second groove and the second protrusion engages with the first groove.

12. The backplane module as claimed in claim 11, wherein
the first support comprises a first bottom for supporting the backplane, a first wall for pressing the liquid crystal panel, and a first sidewall connecting the first bottom and the first wall, the first sidewall is for abutting against one end of the backplane, and the first bottom, the first wall, and the first sidewall cooperatively define the first receiving slot; and
the second support comprises a second bottom for supporting the backplane, a second wall for pressing the liquid crystal panel, and a second sidewall connecting the second bottom and the second wall, the second sidewall is for abutting against the other end of the backplane, and the second bottom, the second wall, and the second sidewall cooperatively define the second receiving slot.

13. The backplane module as claimed in claim 12, wherein
a guiding slot is arranged in the second end of the first support to guide the second support to slide in a predetermined direction; or
a guiding slot is arranged in the second end of the second support to guide the second support to slide in a predetermined direction.

14. The backplane module as claimed in claim 13, wherein the first latch and the third latch are made by elastic materials so that the first latch is detached from the first receiving slot when extrusion pressure being applied to the first support and the second support in the guiding slot is larger than a predetermined value.

15. The backplane module as claimed in claim 10, wherein the first latch is a first hook, the second latch is a second hook, the third latch is a first slot, the fourth latch is a second slot, in pre-position state, the first hook engages with the first slot, and in positioned state, the first hook engages with the second slot and the second hook engages with the first slot.

16. The backplane module as claimed in claim 15, wherein
the first support comprises a first bottom for supporting the backplane a first wall for pressing the liquid crystal panel, and a first sidewall connecting the first bottom and the first wall, the first sidewall is for abutting against one end of the backplane, and the first bottom, the first wall, and the first sidewall cooperatively define the first receiving slot; and the second support comprises a second bottom for supporting the backplane, a second wall for pressing the liquid crystal panel, and a second sidewall connecting the second bottom and the second wall, the second sidewall is for abutting against the other end of the backplane, and the second bottom, the second wall, and the second sidewall cooperatively define the second receiving slot.

17. The backplane module as claimed in claim 16, wherein a guiding slot is arranged in the second end of the first support to guide the second support to slide in a predetermined direction; or a guiding slot is arranged in the second end of the second support to guide the second support to slide in a predetermined direction.

18. The backplane module as claimed in claim 17, wherein the first latch and the third latch are made by elastic materials so that the first latch is detached flora the first receiving slot when extrusion pressure being applied to the first support and the second support in the guiding slot is larger than a predetermined value.

19. The backplane module as claimed in claim 8, wherein the backplane module comprises a plurality of the first supports and second supports, and each of the first supports correspond to each of the second support.

\* \* \* \* \*